(12) United States Patent
Heath

(10) Patent No.: US 6,982,764 B1
(45) Date of Patent: Jan. 3, 2006

(54) IMAGE ENHANCEMENT

(75) Inventor: Thomas S. Heath, Syracuse, NY (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/577,478

(22) Filed: May 25, 2000

(51) Int. Cl.
H04N 7/18 (2006.01)
G09G 5/00 (2006.01)

(52) U.S. Cl. .................. 348/580; 382/293; 715/723

(58) Field of Classification Search ............ 348/584, 348/588, 576, 571, 144, 147, 625, 598, 580, 348/441, 459, 607, 14.12–14.14; 382/289, 382/291, 293–297, 300, 236, 284, 298, 299, 382/287, 288, 286; 715/723, 719, 732
See application file for complete search history.

(56) References Cited

U.S. PATENT DOCUMENTS

| | | | | |
|---|---|---|---|---|
| 5,227,863 A | * | 7/1993 | Bilbrey et al. | 348/578 |
| 5,485,611 A | * | 1/1996 | Astle | 707/1 |
| 5,581,302 A | * | 12/1996 | Ran et al. | 348/416 |
| 5,649,032 A | * | 7/1997 | Burt et al. | 382/284 |
| 5,949,914 A | * | 9/1999 | Yuen | 382/254 |
| 5,999,662 A | | 12/1999 | Burt et al. | 382/284 |
| 6,018,349 A | * | 1/2000 | Szeliski et al. | 345/629 |
| 6,044,181 A | * | 3/2000 | Szeliski et al. | 382/284 |
| 6,084,989 A | * | 7/2000 | Eppler | 382/293 |
| 6,097,854 A | * | 8/2000 | Szeliski et al. | 382/284 |
| 6,157,747 A | * | 12/2000 | Szeliski et al. | 382/284 |
| 6,249,613 B1 | * | 6/2001 | Crinon et al. | 382/236 |
| 6,295,322 B1 | * | 9/2001 | Arbeiter et al. | 375/240.29 |
| 6,298,145 B1 | * | 10/2001 | Zhang et al. | 382/103 |
| 6,510,177 B1 | * | 1/2003 | De Bonet et al. | 375/240.16 |
| 6,646,655 B1 | * | 11/2003 | Brandt et al. | 345/723 |

OTHER PUBLICATIONS

Technical Report No. RL-TR-96-21 entitled "Multiframe Integration for High Resolution Video Stills", by Dr. Robert L. Stevenson and Dr. Richard R. Schultz, Feb. 1996, pp. 1-44.

* cited by examiner

*Primary Examiner*—Paulos M. Natnael
(74) *Attorney, Agent, or Firm*—Lowe Hauptman & Berner LLP.

(57) ABSTRACT

Disclosed is a computer-implemented method of enhancing a video image. A sequence of video frames is extracted. Each of the video frames is upsampled. The upsampled video frames are interpolated. The interpolated video frames are aligned and a single image is created from the aligned video frames.

21 Claims, 13 Drawing Sheets

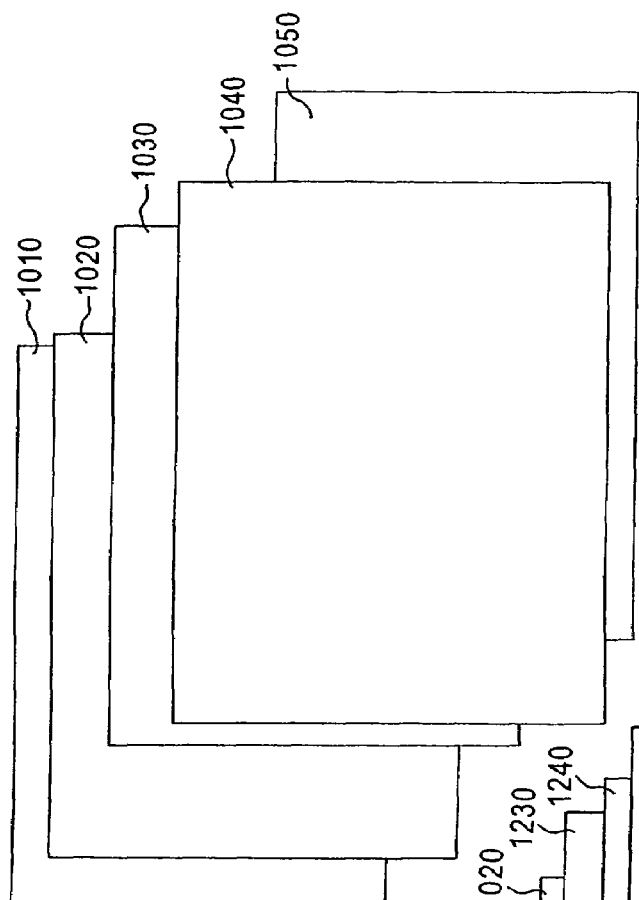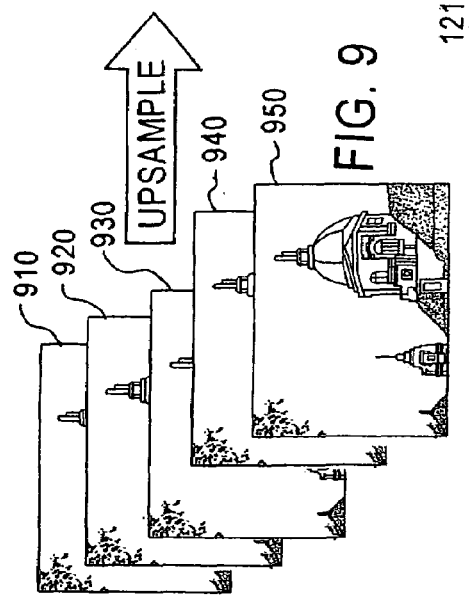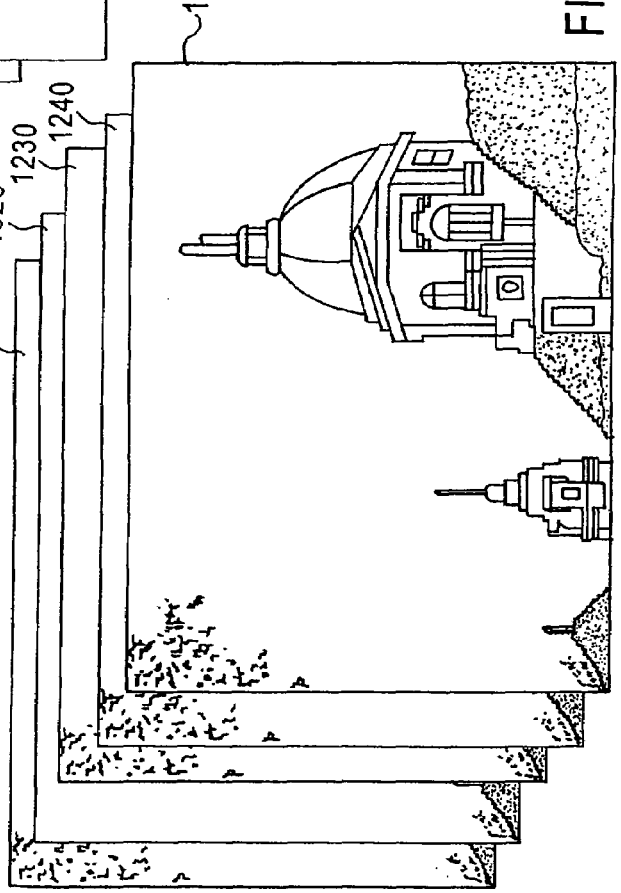

| 1-1 .80 | 1-2 .75 | 1-3 .70 | 1-4 .65 | 1-5 .60 |
|---|---|---|---|---|
| 2-1 .80 | 2-2 | 2-3 | 2-4 | 2-5 .675 |
| 3-1 .80 | 3-2 | 3-3 | 3-4 | 3-5 .75 |
| 4-1 .80 | 4-2 | 4-3 | 4-4 | 4-5 .825 |
| .80 5-1 | .825 5-2 | .85 5-3 | .875 5-4 | .90 5-5 |

FIG. 11

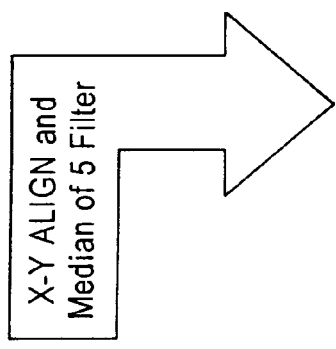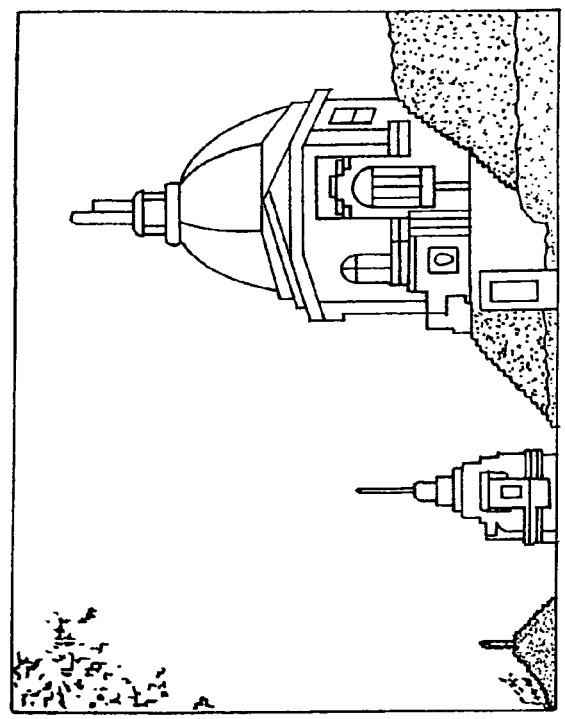
FIG. 13

IMAGE ENHANCEMENT

GOVERNMENT LICENSE RIGHTS

The U.S. Government has a paid-up license in this invention and the right in limited circumstances to require the patent owner to license others on reasonable terms as provided for by the terms of Contract No. GSA D.0.F30602-00-FA001 awarded by the Air Force Research Laboratory (AFRL).

RELATED APPLICATION

The present application is related to co-pending patent application entitled "VIDEO MOSAIC", (Ser. No. 09/577, 487) and assigned to the instant assignee and filed on even date herewith and is hereby incorporated by reference in its entirety into this specification in its entirety.

FIELD OF THE INVENTION

The present invention is related generally to video mosaics, and more particularly, to an image enhancement process used in conjunction with a video mosaic process.

BACKGROUND OF THE INVENTION

Until recently, image processing systems have generally processed images, such as frames of video, still photographs, and the like in an individual manner. After processing, the individual images are combined to form a mosaic, i.e., an image that contains a plurality of individual images. Additional image processing is performed on the mosaic to ensure that the seams between the images are invisible such that the mosaic looks like a single large image. The alignment was previously done manually by a technician to remove the seams. In such computer aided processing systems, the technician manually selects processed images, manually aligns those images, and a computer applies various images combining processes to the images to remove any seams or gaps between the images.

One problem that has been noted with respect to video mosaics is that the video mosaics produce low resolution images because the video images are low resolution images. One proposed solution is disclosed in a final Technical Report No. RL-TR-96-21, entitled "Multiframe Integration for High-Resolution Video Stills", by Dr. Robert L. Stevenson and Dr. Richard R. Schultz. Although the solution proposed in this report provides excellent results, the drawback to the solution is there requires significant processing complexity. A need still exists in the art for an image enhancement process which can be performed by computer processing equipment mounted on an unmanned aeriel vehicle (UAV).

SUMMARY OF THE INVENTION

It is, therefore, an object of the present invention to provide an image enhancement process and system which requires minimal computer processing capability.

It is another object of the present invention to provide an image enhancement process and system which can be performed on-board a vehicle such as a UAV taking a sequence of video images.

Another object of the present invention is to provide an image enhancement process in which the sequence of video images is upsampled. Registration is then performed to align the images and then one enhanced video image is formed.

These and other objects of the present invention are achieved by a computer-implemented method of enhancing a video image. A sequence of video frames is extracted. Each of the video frames is upsampled. The upsampled video frames are interpolated. The interpolated video frames are aligned and a single image is created from the aligned video frames.

The foregoing and other objects of the present invention are achieved by a computer architecture. A sequence of video frames is extracted. each of the video frames is upsampled. The upsampled video frames are interpolated. The interpolated video frames are aligned and a single image is created from the aligned frames.

The foregoing and other objects of the present invention are achieved by an article including at least one sequence of machine executable instructions. A medium bears the executable instructions in machine form and executes the instructions by one or more processors caused by the one or more processors. A sequence of video frames is extracted. Each of the video frames is upsampled. The upsampled video frames are interpolated. The interpolated video frames are aligned and a single image is created from the aligned video frames.

The foregoing and other objects of the present invention are achieved by a computer system, a processor and a memory coupled to the processor. The memory has stored sequences of instructions which when executed by the processor causes the processor to perform the following. A sequence of video frames is extracted. Each of the video frames is upsampled. The upsampled video frames are interpolated. The interpolated video frames are aligned and a single image is created from the aligned video frames.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 9 is a series of five resolution images;

FIG. 10 is an upsampled sparsely populated matrix corresponding to the images of FIG. 7;

FIG. 11 is an enlargement of adjacent pixels in a small section from FIG. 10;

FIG. 12 are five interpolated images corresponding to FIG. 10;

FIG. 13 is a final image after x, y alignment and filtering; and

BEST MODE FOR CARRYING OUT THE INVENTION

A method and apparatus for enhancing an image from a video mosaic taken are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
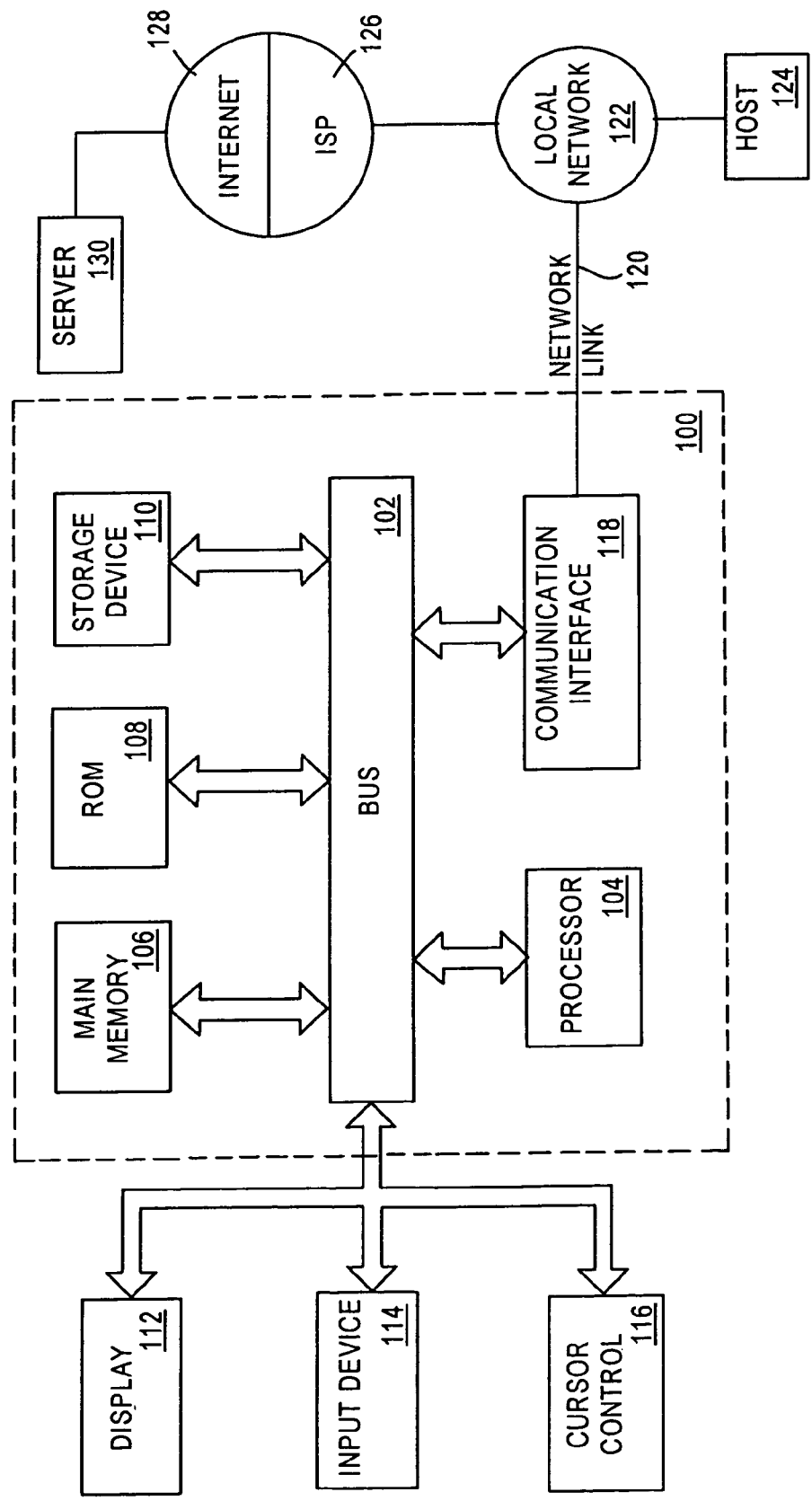
FIG. 1 is a high-level block diagram of a computer architecture usable with the present invention.

FIG. 1 is a block diagram illustrating an exemplary computer system 100 upon which an embodiment of the invention may be implemented. The present invention is usable with currently available personal computers, mini-mainframes and the like. Advantageously, the present invention reduces the amount of processing capability required and can be processed on-board a UAV.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to display an enhanced image of a video mosaic. According to one embodiment of the invention, the enhanced image of the video mosaic is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the enhanced image of the video mosaic. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for an image enhancement process used in conjunction with a video mosaic process as described herein.

The received code may be executed by processor 104 as it is received, and/or stored in storage device 110, or other non-volatile storage for later execution. In this manner, computer system 100 may obtain application code in the form of a carrier wave.

Figure 2B:
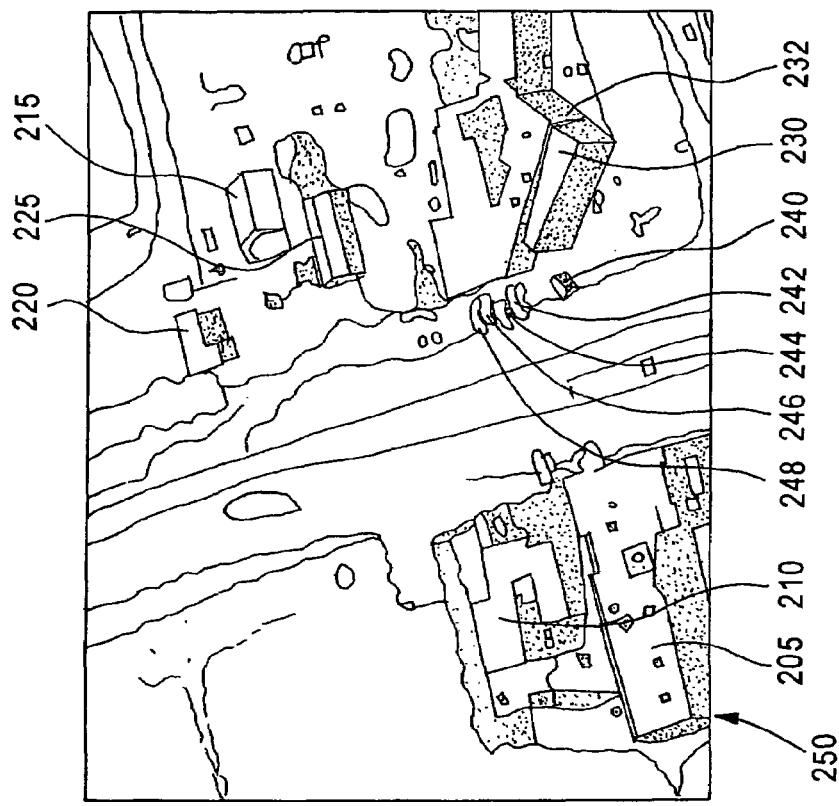
FIGS. 2A and 2B are illustrations of a sequence of two consecutive video frames.
Figure 2A:
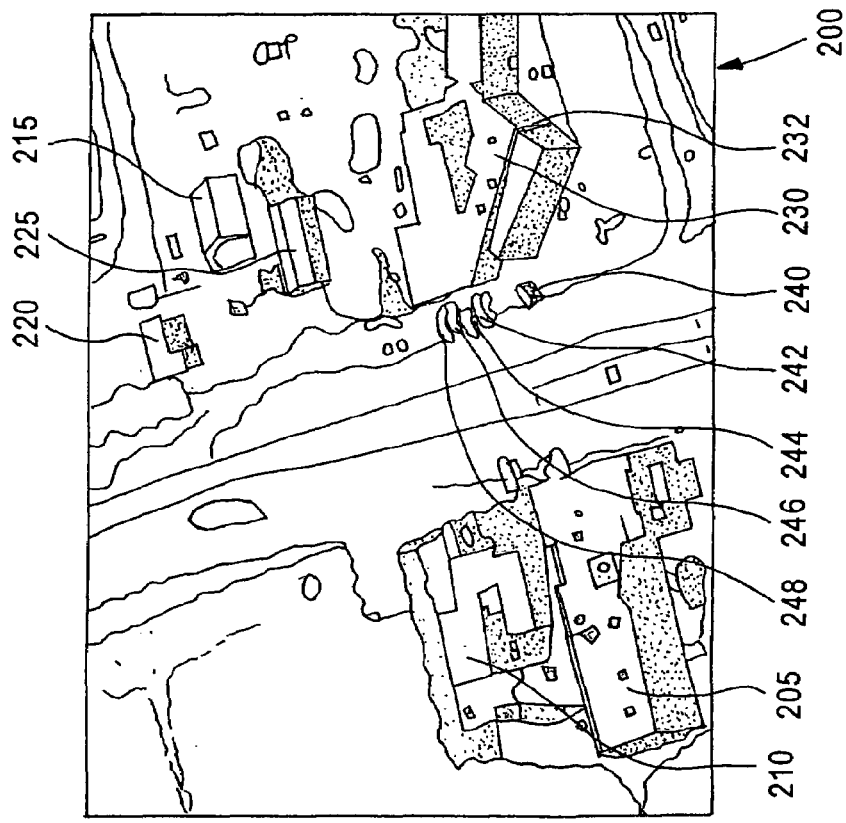

As depicted in FIGS. 2A and 2B there are a plurality of structures 205, 210, 220, 225, 230, 240, 242, 244, 246 and 248. As depicted in photos 200 and 250, a building structure 205 is located at the lower left hand corner of both frames. As is evident from frames 200 and 250, building structure 205 is not in the same location in each of the consecutive video frames 200, 250 because of the motion of the camera. Structures 215, 220 and 225 are building structures which are in the upper right hand portion of video frames 200 and 250. Structure 230 is a building structure having multiple sides and having a v-shaped portion 232. A plurality of automobiles 240–248 are parked adjacent to building structure 230.

Figure 3B:
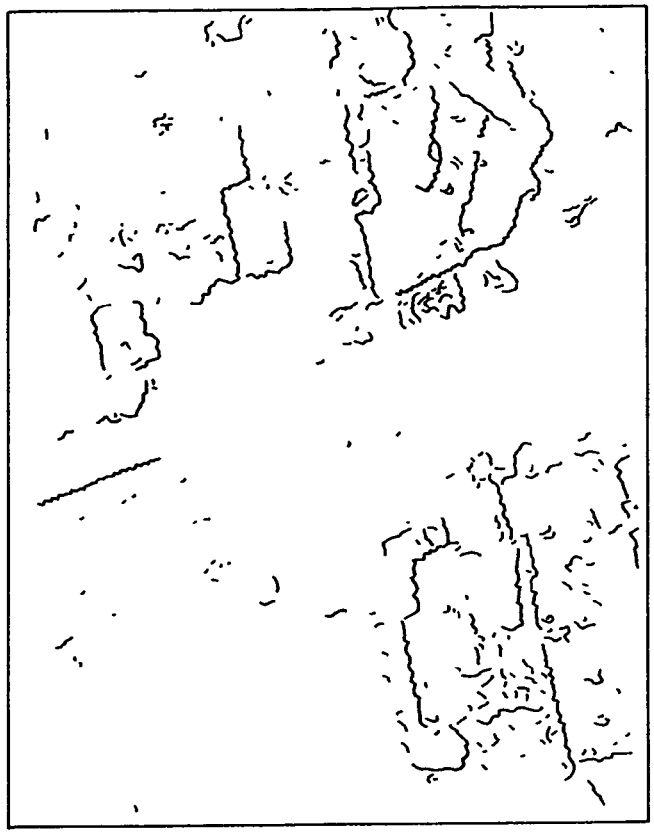
FIGS. 3A and 3B are illustrations of a sequence of two consecutive edge detected frames corresponding to FIGS. 2A and 2B.
Figure 3A:
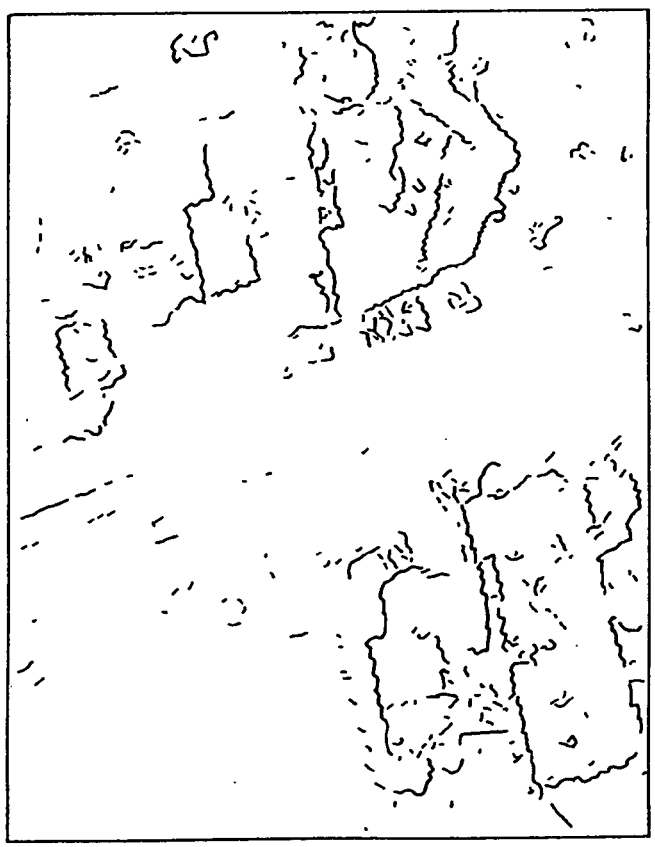

Referring now to FIGS. 3A and 3B, the various structures described in FIGS. 2A and 2B have been detected using an edge detecting process by detecting the change in intensity from one pixel to adjacent pixels. This will be described in greater detail below.

Figure 4A:
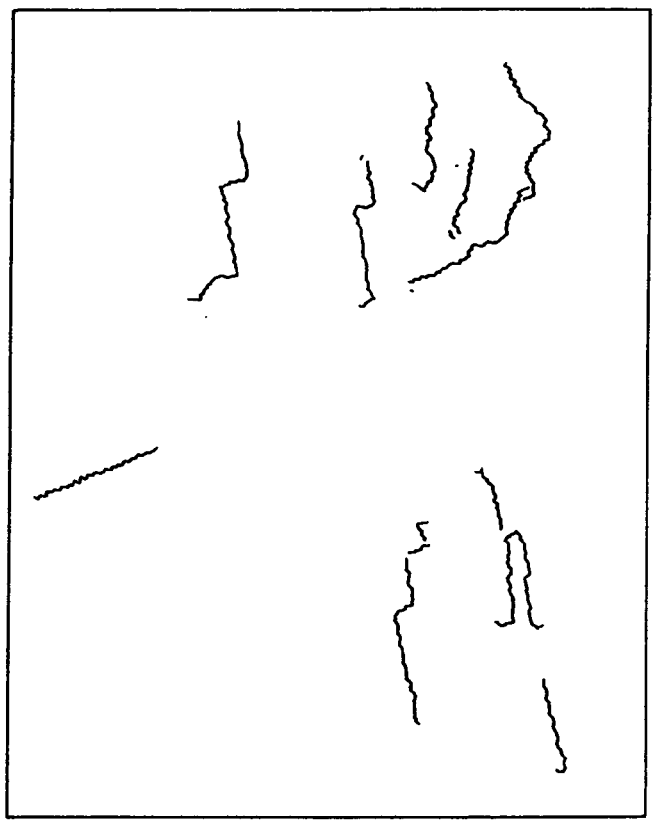
FIGS. 4A and 4B are illustrations of a sequence of consecutive frames with structures identified corresponding to FIGS. 3A and 3B.
Figure 4B:
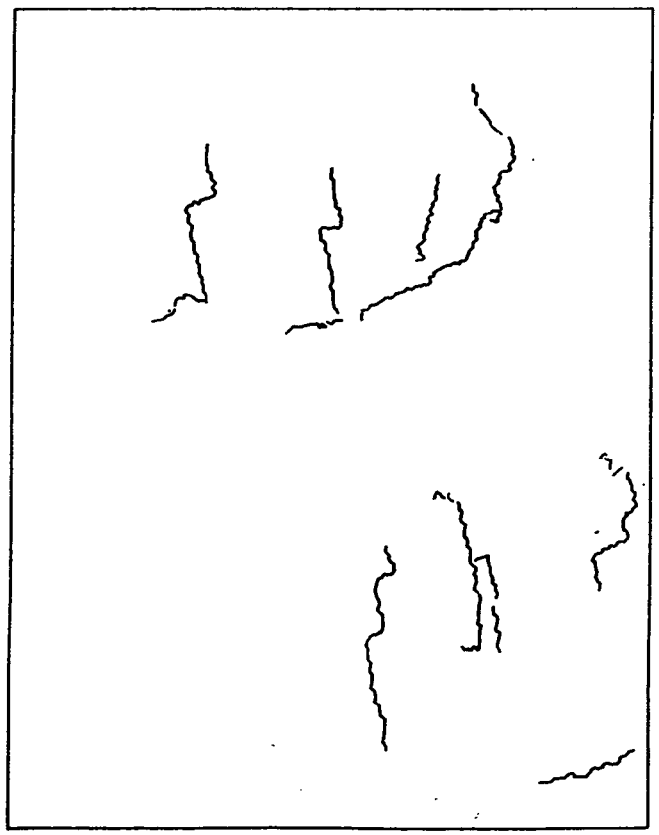
Figure 5B:
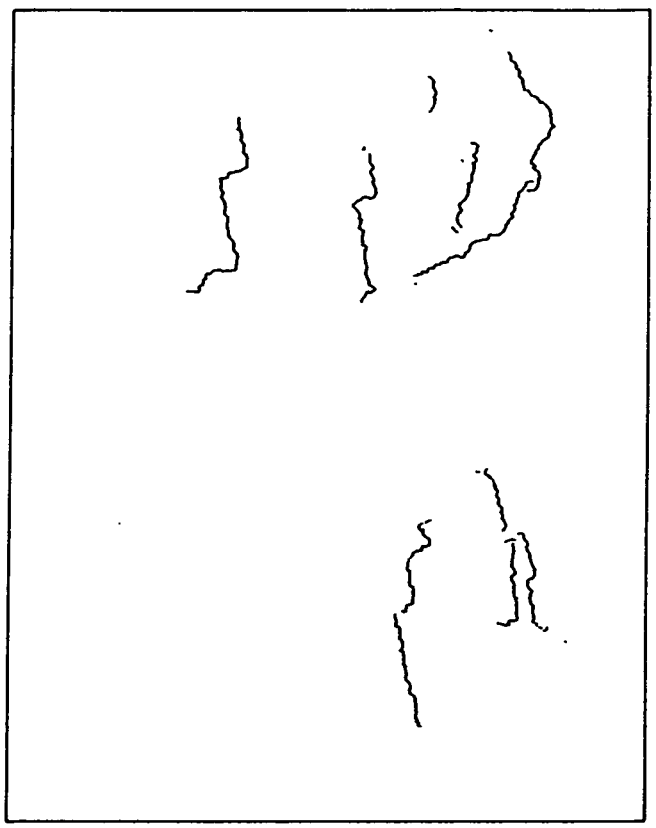
FIGS. 5A and 5B are illustrations of consecutive frames showing matched structures.
Figure 5A:
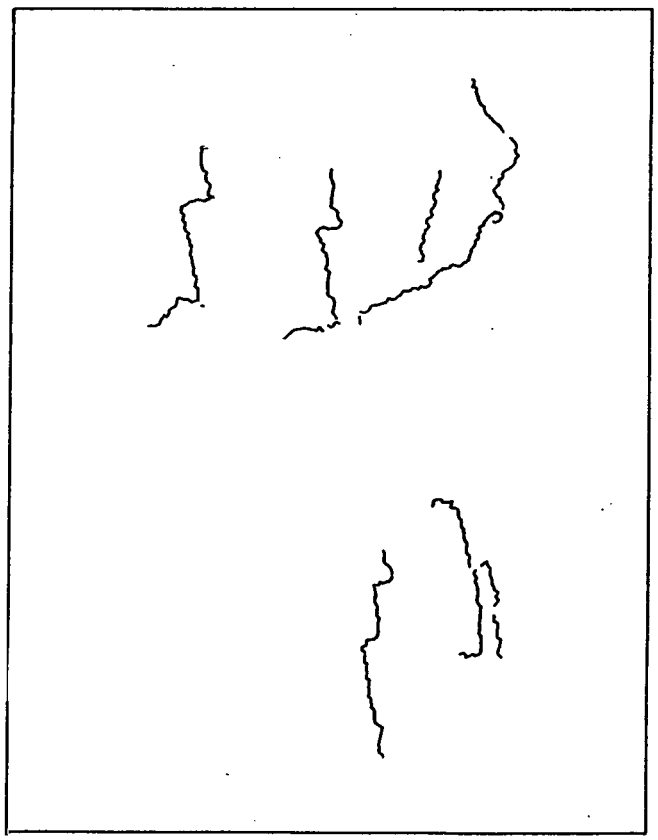

FIGS. 4A and 4B depict consecutive frames with structures having been identified. FIGS. 5A and 5B depict consecutive frames showing matched structures according to the present invention. FIGS. 2A–5B will now be explained with reference to the process of the present invention.

Figure 6A:
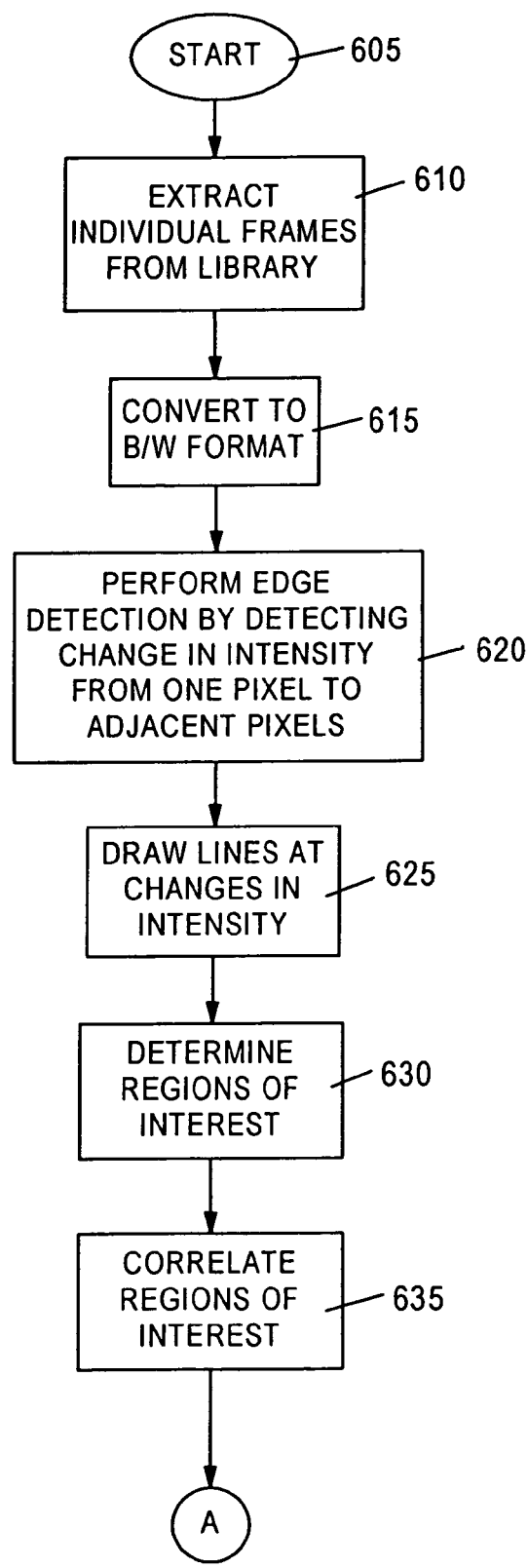
FIGS. 6A and 6B are flow diagrams according to the present invention of constructing a video mosaic.
Figure 6B:
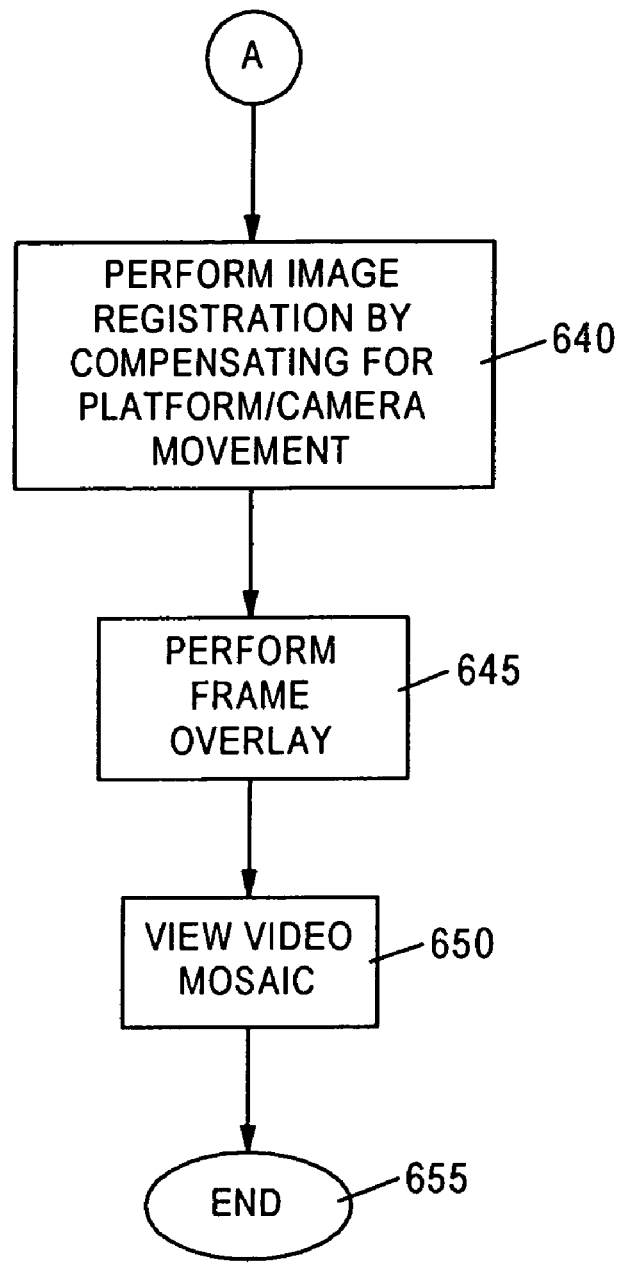

Refer now to FIGS. 6A and 6B showing the process of the present invention. At step 605 the process is started. A step 610, individual frames are extracted from the library. As depicted in FIGS. 2A and 2B, frames 200 and 250 were extracted from the library. At step 615, the extracted individual frames are converted to a black and white format. At step 620, edge detection is performed by detecting change in intensity from one pixel to adjacent pixels. As depicted in FIGS. 3A and 3B, the outlines of various structures are detected. At step 625, lines are drawn at changes of intensity as depicted in FIG. 3. At step 630, regions of interest are determined. At step 635, the regions of interest are correlated as explained with reference to FIGS. 7A and 7B. At step 640, image registration is performed by compensating for platform/camera movement. The registration process accounts for motion of the camera by determining the frame-to-frame x-y offsets, zoom and rotation. At step 645, frame overlay is performed. At step 650, the video mosaic can be viewed. At step 655 the process is ended.

Figure 7:
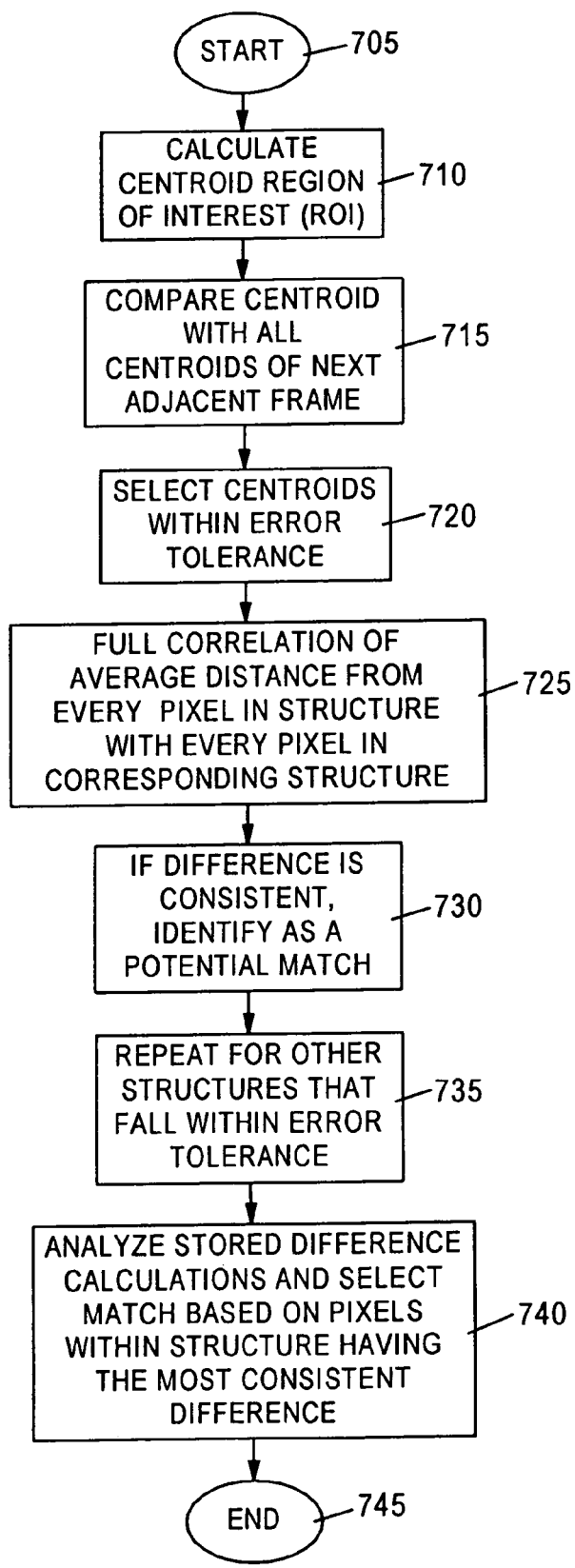
FIG. 7 is a flow diagram of matching identified structures.

Refer now to FIG. 7 where at step 705 the process is started. At step 710, the centroid region of interest (ROI) is calculated. At step 715, the centroid is compared with centroids of the next adjacent frame. At step 720, centroids are selected which are within error tolerances. At step 725, there is a full correlation of average distance from every pixel and corresponding structure. At step 730, if the difference is consistent the structure is identified as a potential match. At step 735, steps 705–730 are repeated for other structures that fall within error tolerance. At step 740, the stored difference calculations are analyzed and select matches are based on pixels within structure having the most consistent differences. The analysis includes looking for frame-to-frame location as indicated by the difference calculation. This consistency will yield x-y translation, rotation and focal length changes.

Figure 8:
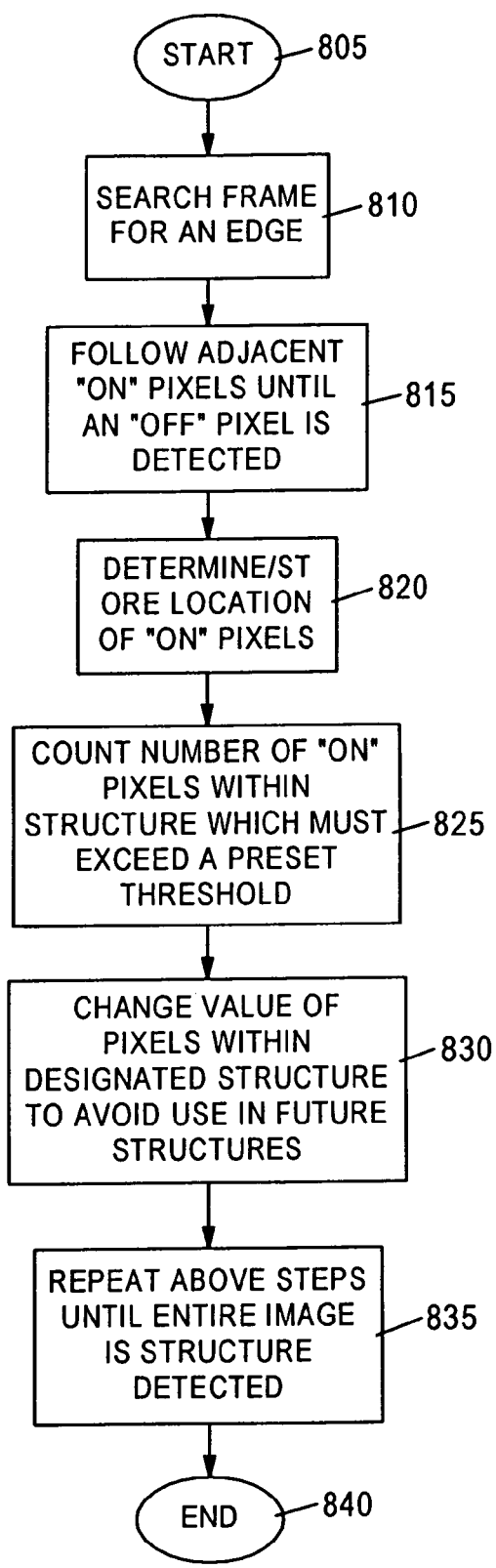
FIG. 8 is a flow diagram of edge detection.

Now referring to FIG. 8, the process is started at step 805. At step 810, the frame is searched for an edge. At step 815, adjacent "on" pixels are followed until an "off" pixel is detected. At step 820, the locations of the "on" are determined pixels and these locations are stored. At step 825, the number of "on" pixels is counted within the structure which must exceed a preset threshold. At step 830, the value of the pixels within a designated structure is changed to avoid use in future structures. At step 835, steps 805–830 are repeated until the entire images in structure detected. At step 840, the process is ended.

As depicted in FIG. 9, five video frames are extracted which were taken at 30 frames a second. Thus, there are video frames 910, 920, 930, 940 and 950 which are extracted from a data library. The data library can be onboard the UAV.

As depicted in FIG. 10, each of the five images is upsampled by a factor of 4. Referring to FIG. 11, there are four pixels, 1-1, 1-5, 5-1 and 5-5 which were previously adjacent to each other but have now been upsampled by a factor of 4. Thus, a 5×5 matrix has been created. For example, pixel 1-1 has an intensity of 0.80; pixel 1-5 has an intensity of 0.60; pixel 5-1 has an intensity of 0.80; and pixel 5-5 has an intensity of 0.90.

The images are then aligned as discussed above with respect to FIGS. 2–9. After the images have been aligned, then an average value from each of the five images in sequence is taken as depicted in FIG. 12. In FIG. 12, there are a series of five images 1210, 1220, 1230, 1240 and 1250 which correspond to the images 910, 920, 930, 940, 950. These five images are then combined and averaged into a single image as depicted in FIG. 13.

Figure 14:
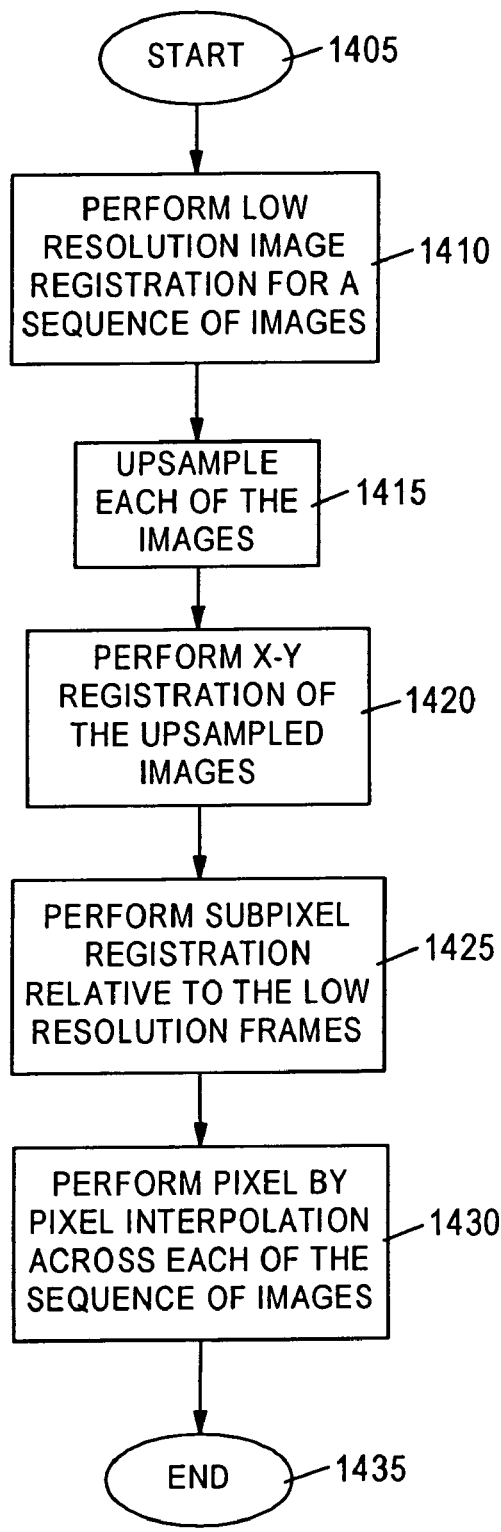
FIG. 14 is a flow diagram according to the present invention of enhancing a video mosaic.

Referring now to FIG. 14, a flow diagram summarizing the steps of the present invention is illustrated. At step 1405, the process is started. At step 1410, a low resolution image registration is performed for a sequence of images. At step 1415, each of the images upsampled. As depicted in FIGS. 10 and 11, the images are upsampled by factor 4. Other upsampling factors could be used, but the factor of 4 appears to be optimal, yielding the most consistent results. Less than 4 could be used, but the idea is to create the highest resolution possible. Using a factor greater than 4 will result in diminishing returns, in that the amount of memory and processor capacity required will not necessarily produce a sufficiently higher quality image. At step 1420, an x, y registration is performed for the upsampled images. At step 1425, the upsampled images are then aligned using a simple correlation technique to determine the x-y frame-to-frame offsets. At step 1430, these aligned, upsampled images are then combined into a high resolution output image by performing a pixel-by-pixel average across all 5 of the upsampled aligned images. At step 1435, the process is ended.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer-implemented method of enhancing a video image, comprising:

extracting a sequence of video frames;
upsampling each of the video frames;
interpolating the upsampled video frames;
detecting at least one region of interest in the video frames;
aligning the interpolated video frames using the detected at least one region of interest in the video frames; and
creating a single image from the aligned video frames.

2. The method of claim 1, wherein said upsample step is by a factor of 4.

3. The method of claim 1, wherein said align step comprises aligning the video images in an x direction and a y direction in a center portion of interest in each video frame.

4. The method of claim 1, comprising extracting the sequence of video frames at 30 frames/sec.

5. The method of claim 1, wherein the sequence of video frames includes 5 video frames.

6. The method of claim 1, comprising correlating the upsampled video images.

7. The method of claim 6, comprising averaging a pixel intensity from each of the upsampled video frames.

8. The method of claim 1, comprising compensating for platform movement and rotation zoom.

9. The method of claim 1, comprising identifying commonality from one individual frame to the next and overlapping the individual frames and displaying an image representing a continuous area.

10. The method of claim 9, comprising extracting the sequence of video frames at 30 frames/sec.

11. The method of claim 10, wherein the sequence of video frames includes 5 video frames.

12. The method of claim 11, comprising correlating the upsampled video images.

13. The method of claim 12, comprising averaging a pixel intensity from each of the upsampled video frames.

14. The method of claim 13, comprising compensating for platform movement and rotation zoom.

15. The method of claim 14, comprising identifying commonality from one individual frame to the next and overlapping the individual frames and displaying an image representing a continuous area.

16. The method of claim 15, comprising extracting the sequence of video frames at 30 frames/sec.

17. The computer-implemented method of claim 1, wherein said comparing step includes comparing pixel values within detected regions of interest; and
wherein said setting step includes setting said frame-to-frame distance offset based on said compared pixel values.

18. The computer-implemented method of claim 1, wherein the detecting step includes counting the number of on pixels within a region of interest and comparing the number to a preset threshold value to determine a region of interest.

19. A computer architecture, comprising:
extracting means for extracting a sequence of video frames;
upsampling means for upsampling each of the video frames;
interpolating means for interpolating the upsampled video frames;
detecting at least one region of interest in the video frames;
aligning the interpolated video frames using the detected at least one region of interest in the video frames; and
creating means for creating a single image from the aligned video frames.

20. An article, comprising:
at least one sequence of machine executable instructions;
a medium bearing the executable instructions in machine form, wherein execution of the instructions by one or more processors causes the one or more processors to:
extract a sequence of video frames;
upsample each of the video frames;
interpolate the upsampled video frames;
detect at least one region of interest in the video frames;
align the interpolated video frames using the detected at least one region of interest in the video frames; and
create a single image from the aligned video frames.

21. A computer system, comprising:
a processor; and
a memory coupled to said processor, the memory having stored therein sequences of instructions, which, when executed by said processor, causes said processor to perform the steps of:
extract a sequence of video frames;
upsample each of the video frames;
interpolate the upsampled video frames;
detect at least one region of interest in the video frames;
align the interpolated video frames using the detected at least one region of interest in the video frames; and
create a single image from the aligned video frames.

* * * * *